United States Patent [19]
Wenzel

[11] 3,818,288
[45] June 18, 1974

[54] CAPACITOR WITH FLAME INHIBITING CORE

[75] Inventor: Kurt Wenzel, Vienna, Austria

[73] Assignee: Telephon-und Telegraphen-Fabriks Aktiengesellschaft Kapsch & Sohne in Wien, Vienna, Austria

[22] Filed: May 31, 1973

[21] Appl. No.: 365,726

[30] Foreign Application Priority Data
May 31, 1972 Austria .............................. 4695/72
Oct. 3, 1972 Germany.......................... 2248485

[52] U.S. Cl.................. 317/258, 317/247, 317/260
[51] Int. Cl............................................. H01g 1/11
[58] Field of Search .......... 317/260, 258, 242, 247; 29/25.42; 174/DIG. 8

[56] References Cited
UNITED STATES PATENTS
1,127,513  2/1915  Pruessman....................... 317/260
3,093,448  6/1963  Kirkpatrick.................... 174/DIG. 8
3,731,130  5/1973  Dutta................................. 317/260

FOREIGN PATENTS OR APPLICATIONS
1,116,177  6/1968  Great Britain..................... 317/242

*Primary Examiner*—E. A. Goldberg
*Attorney, Agent, or Firm*—Wenderoth, Lind & Ponack

[57] ABSTRACT

A roll-type capacitor includes a roll made of strip-shaped metal electrodes and plastic foils arranged as a dielectric between the electrodes and is surrounded by an envelope of plastic embracing the periphery of the roll. The envelope consists of thermally shrinkable material and contacts the roll under elastic stress. The envelope material may be e.g., polyvinylchloride, that releases flame-inhibiting gases, in particular chlorine, when heated. The roll has a core consisting of a material that releases flame-inhibiting gases when heated. The envelope may consist of a layer or a plurality of layers of a self-sealing shrinkable foil.

5 Claims, 2 Drawing Figures

CAPACITOR WITH FLAME INHIBITING CORE

BACKGROUND OF THE INVENTION

The invention relates to a roll-type capacitor, wherein a roll made of strip-shaped metal electrodes and plastic foil arranged as dielectric between the electrodes is surrounded by an envelope of plastic embracing the periphery of the roll.

Capacitors of this kind are ordinarily produced through the cooperation of two unilaterally metallized plastic foils, so that the vapor-deposited metal layer forms the electrode. However, the invention includes likewise capacitors wherein nonmetallized foils are wound together with separate conductor foils. Such capacitors possess good electrical properties and their manufacture is substantially simpler than that of the earlier known designs wherein impregnated paper was provided as an intermediate layer. There is a further advantage in relation to impregnated capacitors, where relatively expensive precautions must be taken in order to prevent the flowing out of the impregnation agent.

The low flame-resistance of the roll-type capacitors employing plastic has turned out as disadvantage. The fires generally occur in such a manner that glow discharges take place in the cavities between the metal layer and the adjacent dielectric, if the dimensions of the cavities are not small in relation to the free path length of the gas molecules enclosed therein. Of course, the so-called self-healing of the capacitor occurs first of all in this connection, whereby a hole is formed in the metal layer as the spot struck by the discharge burns out, so that the discharge is extinguished. This is disadvantageous first of all in that the capacitance of the capacitor is reduced thereby, but additionally, in that the self-healing mechanism is not always effective. Again and again it happens that prior to the disappearance of a glow discharge the adjacent plastic foil is damaged to such an extent that current paths are formed in the capacitor, which leads to burning-out of the capacitor.

Accordingly, the elimination of the detrimental glow discharges in the capacitor is of greatest importance. For this purpose, it has been proposed that foils stretched prior to winding be employed as the dielectric, so that during the following heating such foils contract, thereby eliminating the air cavities in the capacitor. This is associated with the disadvantage that fire-safe foils are indeed known at the present time, but there are not known foils that would possess a marked self-shrinking effect and, at the same time, be economical and possess the required dielectric properties. Accordingly, if non-fireproof foils are employed at the present time owing to their thermal shrinking properties, it must be made certain that glow discharges of large dimensions are actually avoided in such a capacitor. However, this cannot be attained with certainty merely through the employment of self-shrinking foils. It has now been found that this is due to the loosening of the external layers after prolonged operation, especially under the effect of alternating current. The loosening occurs also in the case where the roll is surrounded in known manner by a protective envelope of plastic. In order to prevent this effect, it would not be expedient to glue or to weld the end of the capacitor foils to the roll, since the electrical properties of the capacitor would thereby be deteriorated while the outermost turns of the capacitor would not actually be subjected to a sufficient radial pressure to prevents the formation of cavities.

SUMMARY OF THE INVENTION

In the capacitor of the invention, the appearance of glow discharges is prevented in the outer layers of a roll-type capacitor by providing an envelope of thermally shrinkable material enclosing the roll under elastic stress.

Accordingly, the invention is based on the discovery that it is not sufficient merely to surround a roll-type capacitor with a protective envelope. Rather, the envelope must be pressed with a great pressure against the roll, specifically by shrink-fitting the envelope. The envelope may be tubular, or it may consist of a layer or a plurality of layers of a shrinkable foil which is joined to itself. Preferably, the material of the envelope should not only be incombustible as such but should also possess the property of releasing under heat small amounts of flame-inhibiting gases that prevent the combustion of the inner layers that are not fireproof. This property is exhibited in particular by polyvinylchloride (PVC).

Through the shrink-fit envelope proposed in accordance with the invention it is possible to obtain an excellent cohesion with the capacitor roll especially in the case where a solid core is provided in the interior of the roll, the core preferably also consisting of flame-inhibiting material.

Further details of the invention as well as the manufacture of the capacitor of the invention will be explained more precisely in the following description taken with the accompanying drawings.

DETAILED DESCRIPTION OF THE INVENTION

Figure 2:
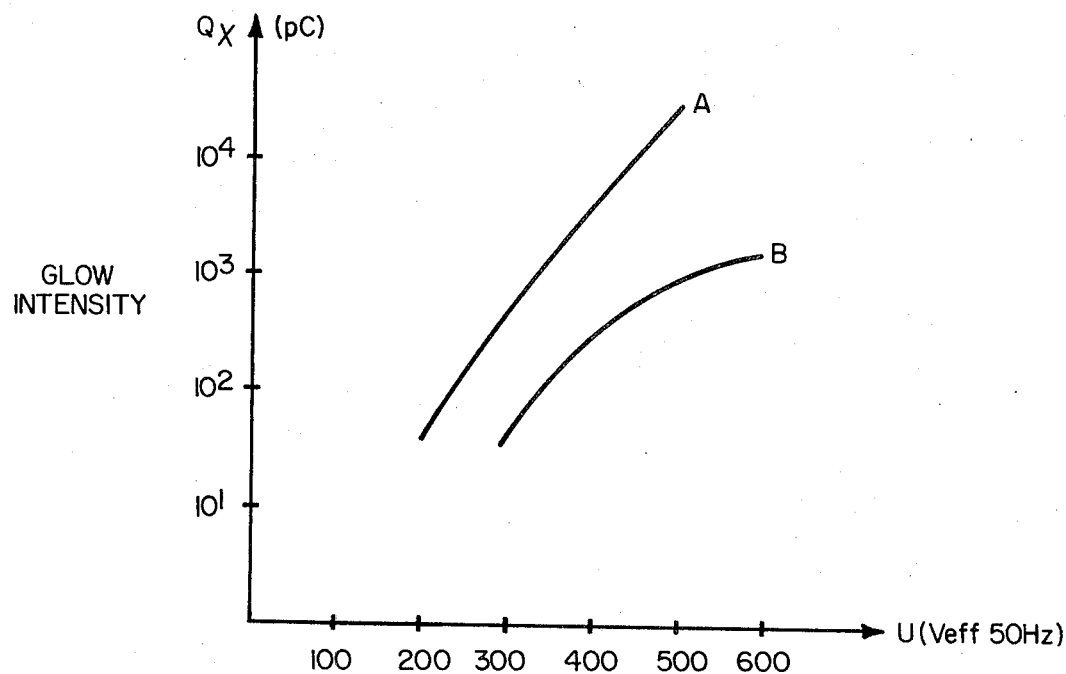
FIG. 2 is a diagram illustrating the improvements obtained through the invention.
Figure 1:
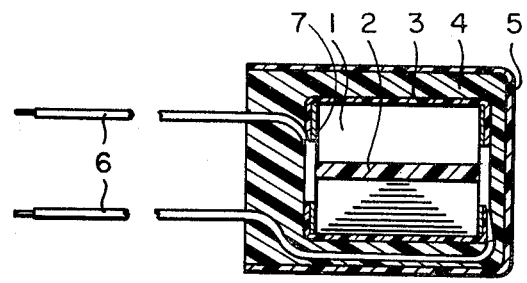
FIG. 1 is a section through a capacitor of the invention.

In the manufacture of the capacitor illustrated in FIG. 1, a roll 1 is formed first from plastic foils provided with vapor-deposited metal, stretched polypropylene being recommended in particular as the material for the plastic foils. Roll 1 is placed on a core 2 of PVC and then heat-treated at a temperature of 130°C for about 1 hour in order to produce a firm body. After making front-end connections 7 and in order to prevent a loosening of the outer layers of the roll during operation, a tubular envelope 3 having leads 6 and consisting of thermally shrinkable material is pulled over roll 1 and heated for a few minutes at about 100°C, e.g., in a tunnel furnace. Owing to this, the envelope 3 which may consist of polyvinylchloride, polytetrafluorethylene, fluorinated ethylene and propylene or of polyamide, is pressed with great force against roll 1. FIG. 2 shows the behavior of the capacitor before the envelope is shrink-fit (curve A) and after it is shrink-fit (curve B). It is obvious, that in the case of the enveloped capacitor the glow discharge sets in at substantially higher voltages and, additionally, the curve describing the intensity of the glow discharge is also rounded off distinctly, which may be due to the self-healing phenomena. In order to prevent an accumulation of gases between the enveloped capacitor roll and an outer housing 5 thereof when the capacitor overheats, (which gases may explode in the case of overheating), it may be expedient to fill the intermediate space with a sealing material 4, consisting in particular of epoxy resin. Polyamide is an example of an incombustible material suitable for outer envelope 5.

The capacitor of the invention is suitable in particular for employment as a heavy-duty capacitor under continuous loads of up to 400 V (effective voltage) with capacitances on the order of magnitude of 1 to 400 $\mu$ F.

I claim:

1. A roll-type capacitor comprising:
a core element;
a roll positioned about said core element, said roll being formed of strip-shaped metal electrodes and plastic dielectric foils between said electrodes;
an envelope of thermally shrinkable material shrink-fit around said roll and placing said roll under elastic stress; and
said core element and said envelope being formed of a material capable of releasing flame-inhibiting gases when heated, wherein said material is polyvinylchloride, polytetrafluorethylene, fluorinated ethylene, fluorinated propylene, or polyamide.

2. A capacitor as claimed in claim 1, further comprising an outer housing of non-combustible material surrounding said envelope.

3. A capacitor as claimed in claim 2, wherein said housing is formed of polyamide.

4. A capacitor as claimed in claim 2, further comprising a sealing material filling the space between said envelope and said outer housing.

5. A capacitor as claimed in claim 4, wherein said sealing material comprises epoxy resin.

* * * * *